United States Patent
Glenn, III et al.

(10) Patent No.: US 11,571,000 B2
(45) Date of Patent: *Feb. 7, 2023

(54) SYSTEM AND METHOD FOR PRODUCING CONCENTRATED CREAM

(71) Applicant: Land O'Lakes, Inc., Arden Hills, MN (US)

(72) Inventors: Thomas A. Glenn, III, Shoreview, MN (US); Richard Dinesen, Woodbury, MN (US); Clint Garoutte, Elk River, MN (US); Jason Thompson, Robbinsdale, MN (US)

(73) Assignee: Land O'Lakes, Inc., Arden Hills, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/458,846

(22) Filed: Aug. 27, 2021

(65) Prior Publication Data

US 2021/0386082 A1 Dec. 16, 2021

Related U.S. Application Data

(63) Continuation of application No. 14/011,294, filed on Aug. 27, 2013, now Pat. No. 11,129,393.

(51) Int. Cl.
*A23C 1/12* (2006.01)
*A23C 13/00* (2006.01)
*A23C 9/142* (2006.01)
*B01D 1/22* (2006.01)

(52) U.S. Cl.
CPC .............. *A23C 1/12* (2013.01); *A23C 9/1422* (2013.01); *A23C 13/00* (2013.01); *B01D 1/22* (2013.01)

(58) Field of Classification Search
CPC ........... A23C 1/12; A23C 13/00; A23C 13/12; B01D 1/22
See application file for complete search history.

(56) References Cited

U.S. PATENT DOCUMENTS

| | | | |
|---|---|---|---|
| 3,108,875 A | 10/1963 | Bell | |
| 4,341,801 A | 7/1982 | Weissman | |
| 5,221,550 A | 6/1993 | Freeman | |

FOREIGN PATENT DOCUMENTS

| | | | |
|---|---|---|---|
| EP | 0435822 A1 | 7/1991 | |
| EP | 0517941 A1 | 12/1992 | |
| WO | 8910700 A1 | 11/1989 | |
| WO | 2011122966 A1 | 10/2011 | |

OTHER PUBLICATIONS

International Search Report and Written Opinion issued in International Application No. PCT/US2014/051324, dated Nov. 4, 2014.
"How Thin Film Evaporation Works", LCI Corporation, http://www.iciocorp.com/thin_film_evaporation/category/operation, date unknown.
"Pope Wiped-Film Stills; Introduction and Description of Basic Technology", Bulletin No. 1, Rev. Aug. 2000, available at http://www.popeinc.com/uploads/files/literature/Bulletin%201.pdf.
"Rotors: Wiped Film or Thin Film (Rigid)?", VTA GmbH, http://www.avtaus.com/docs/VTA_Tech_Update_Rotors.pdf, Technical Update, Feb. 2010.
"Thin Film Evaporation", Schulz Partner GmbH, http://www.schulzpartner.com/en/Produkte/Thermische_Verrfahren/Duennschichttechnik/, date unknown.
"Wiped Film Evaporator-WFE", Brochure, Pfaudler Engineered Systems, available at http://www.pesllconline.com/wp-content/uploads/2012/03/Wiped-Film-Evaporator-WFE.pdf.
Anonymous, "Krema Galaktos", Jan. 2005, Database GNPD (Online) Mintel, XP002731061, Database Accession No. 330567.
Belitz, et al., "Food Chemistry", pp. 431-432, 2013.
Black, et al., "A Study of Factors Influencing Moisture Control in Butter from Evaporated Cream", The Australian Journal of Dairy Technology, pp. 53-54, Jun. 1978.
Con Foo, et al., "A Comparison of the Keeping Quality of Butters Manufactured From the Evaporative Treatment of Cream (ETC) and Vacreation Processes", The Australian Journal of Dairy Technology, pp. 145-146, Dec. 1980.
Con Foo, et al., "Use of Evaporative Treatment of Cream (ETC) to Increase Butter Yield", The Australian Journal of Dairy Technology, pp. 154-158, Dec. 1977.
Evers, et al., "Heterogeneity of Milk Fat Globule Membrane structure and Composition as Observed Using Fluorescence Microscopy Techniques", International Dairy Journal, vol. 18, 2008, pp. 1081-1089, ELSEVIER.
Glover, "Selecting Evaporators for Process Applications", Chemical Engineering Progress, Dec. 2004, pp. 26-33.
Vedder, "Selection of an Agitated Thin-Film Evaporator for Processing a Radioactive Waste at ORNL", ORNL, Oct. 1989, available at http://web.ornl.gov/info/reports/1989/3445605662814.pdf.

*Primary Examiner* — Jeffrey P Mornhinweg
(74) *Attorney, Agent, or Firm* — Dorsey & Whitney LLP (57) ABSTRACT

Concentrated creams are produced from starting cream compositions characterized as homogenous, oil-in-water emulsions containing fat globules, phospholipid membrane components and non-fat solids, and which have an initial fat content between about 35 to about 55 percent by weight. To produce the concentrated creams, moisture is removed from the starting cream compositions through evaporative processing, and as a result, the concentrated cream remains in a homogenous state, retains the fat globules, phospholipid membrane components and non-fat solids, and includes a concentrated fat content of at least about 70 percent by weight. In addition, the concentrated cream may be in an oil-in-water or a bi-continuous emulsion. Evaporative processing may be through a wiped film evaporator or a scraped surface heat exchanger.

20 Claims, 3 Drawing Sheets

SYSTEM AND METHOD FOR PRODUCING CONCENTRATED CREAM

CROSS REFERENCE TO RELATED APPLICATIONS

This application claims priority to U.S. patent application Ser. No. 14/011,294, filed Aug. 27, 2013, issued as U.S. Pat. No. 11,129,393 on Sep. 28, 2021, entitled "SYSTEM AND METHOD FOR PRODUCING CONCENTRATED CREAM," which is incorporated by reference herein, in its entirety and for all purposes.

TECHNICAL FIELD

Aspects of the present disclosure provide concentrated creams having a reduced moisture content relative to traditional creams and methods of producing such concentrated creams using processes in which water is removed while retaining other native cream constituents.

BACKGROUND

Concentrated creams are generally formed from rehydrated creams derived from powdered creams or from centrifugal processes that concentrate traditional cream. Centrifugal concentration of cream typically requires extensive processing to produce a high fat cream or plastic cream, but such processing removes a serum by-product from the cream, which includes water, fat and other non-fat milk solid constituents that include protein, lactose, minerals and vitamins. In the production of anhydrous milk fat (AMF), cream is ultra-concentrated by centrifugal separation with the last portion of moisture being flashed off resulting in a product with high fat concentrations, e.g., not less than 99.8 percent by weight, and produces a by-product stream of milk serum similarly composed of water, fat, and other non-fat milk solid constituents that include protein, lactose, minerals and vitamins. The production of butter through churning cream results in a buttermilk by-product. For each of the aforementioned processes, the by-product streams require further treatment or disposal. These further treatment steps require additional unit operations requiring both significant investment and maintenance of supporting capital and energy expenditure to run these additional processes. Management of these by-products is required due to their perishable nature and increases the overall complexity of the operation. In addition, these processes remove valuable components from the starting cream material including protein and residual fat losses within the by-product stream.

SUMMARY

A concentration process that eliminates the production of the previously noted by-product solid constituents in an effluent stream would yield a less capital intensive, simplified manufacturing operation as these solid by-product constituents could be retained in the primary product stream. In view of the foregoing, the present disclosure provides concentrated cream products and methods for producing concentrated cream products from cream and involves removing water from the liquid cream while retaining native cream constituents. As a result, concentrated creams are produced with essentially no by-products. More specifically, the concentrated creams and processes for producing concentrated cream result in a water only by-product stream, which does not require further processing or costly disposal, thereby eliminating added expense to the production of concentrated cream. By retaining native cream constituents, the concentrated cream may provide health benefits to the consumer.

According to one implementation, a method of producing concentrated cream involves providing a cream composition in a homogenous, oil-in-water emulsion. The cream composition including fat globules, phospholipid membrane components, non-fat solids, and initial fat content of between about 35 to about 55 percent by weight. Moisture is removed through evaporative processing to produce the concentrated cream. The resulting concentrated cream remains in a homogenous state, retains the fat globules, phospholipid membrane components, non-fat solids, and includes a concentrated fat content of at least about 70 percent by weight.

According to another implementation, a method of producing a concentrated cream product involves providing a homogenous, oil-in-water emulsion derived from whole milk, where the emulsion includes fat globules, phospholipid membrane components, non-fat solids, and an initial fat content of the emulsion is between about 35 to about 55 percent by weight. Moisture is removed through evaporative processing to produce the concentrated cream product, which is one or more of an oil-in-water or a bi-continuous emulsion, and the emulsion retains the fat globules, phospholipid membrane components, non-fat solids, and includes a fat content of at least about 70 percent by weight.

In yet another implementation, a concentrated cream product includes a homogenous, oil-in-water or a bi-continuous emulsion including fat globules, phospholipid membranes, non-fat solids, and a fat content of at least about 70 percent by weight.

DETAILED DESCRIPTION

Provided herein is a more functional concentrated cream composition compared to dried creams (which typically require homogenization immediately prior to the drying step) or other cream products formed from churning and separation.

Concentrated cream products: The concentrated creams of the present disclosure contain native cream constituents from the starting cream materials including fat with milk fat globules and phospholipid membrane components; non-fat solids (e.g., skim milk non-fat solid constituents) including protein, vitamins, minerals and lactose; and moisture. These constituents may be in their original, cream-derived form. In some implementations, intact milk fat globule membranes in cream remain intact in the concentrated cream. These fat globules are primarily composed of a globule of triglyceride surrounded by a lipid bilayer membrane, which are stabilized in an emulsion in the aqueous cream environment by the fat globule membrane.

Figure 1A:
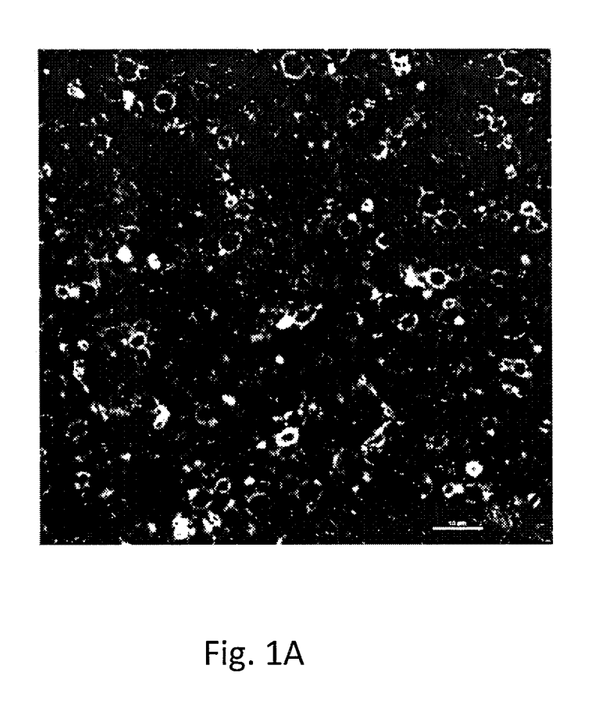
FIGS. 1A and 1B, respectively, are images of a starting cream composition and a concentrated cream according to the present disclosure.
Figure 1B:
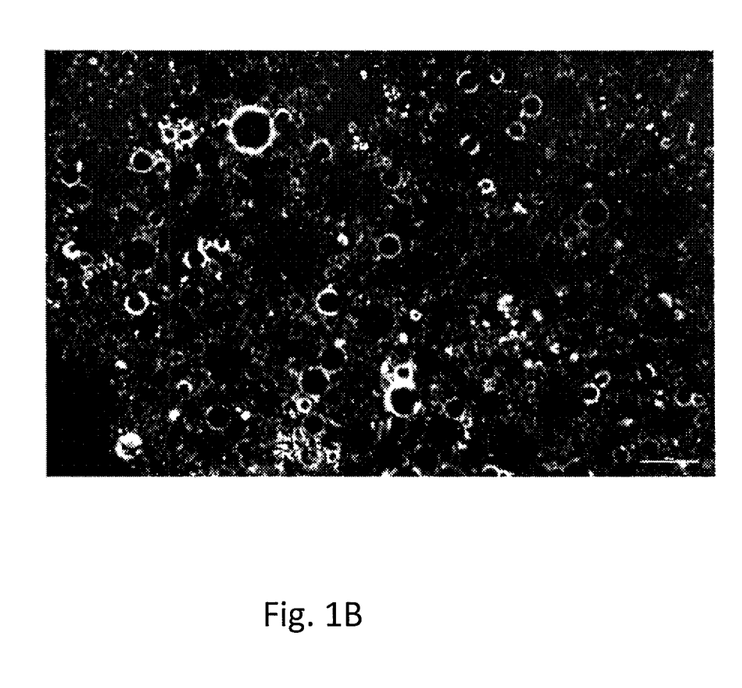

Concentrated creams are homogenous butter-like substances but remain in an oil-in-water or bi-continuous emulsion throughout product formation. FIGS. 1A and 1B illustrate a starting cream composition and a concentrated cream according to the present disclosure, both of which are shown as an oil-in-water emulsion, and therefore are water continuous (i.e. the fat globules do not touch one another in a continuous fashion). The concentrated cream shown in FIG. 1B was produced from unsalted cream having a fat content of 46.4 percent by weight being fed to a Pfaulder Model 8.8-12S-0-S wiped film evaporator having 8.8 square feet of heated surface area under the operating parameters of Table 1.

TABLE 1

Operating parameters for the production of and starting and final solids of the concentrated cream of Fig. 1B

| | |
|---|---|
| Feed Product Temperature: | 127° F.-129° F. |
| Hot Water Temperature: | 146° F.-151° F. |
| Hot Water Setting: | 150° F.-165° F. |
| WFE RPM: | 197 RPM |
| WFE Amps: | 5.63-5.74 Amps. |
| Feed Pump Speed Setting: | 0.375 gal/min |
| Vacuum at pump: | 23 inHg |
| Vacuum at top of column: | 26 inHg |
| Steam: | 64-66 psi |
| Starting Solids: | 50.12% |
| Final Total Solids: | 74.6%-84.87% |

The images of the starting cream (FIG. 1A) and resulting concentrated cream product (FIG. 1B) were obtained by first dying the samples using Wheat Germ Agglutinin-Alexa 488 ("WGA-A488" Invitrogen W-11261) (5 mg vial, dissolve in 2.5 ml PBS (phosphate buffered saline) to 2 mg/ml. Final concentration of 10 μg/ml (1:200)). The starting cream sample was in liquid form and was prepared by mixing 500 μl with the dye and placing in a block at about 45° C. 10 μl aliquots were removed, placed on glass slides and covered with an 18×18 mm cover slip. The concentrated cream product was in solid form and was prepared by thinly smearing the product on glass slides, placing 20 μl of diluted dye on top of the smear and covering the sample with an 18×18 mm cover slip. The two samples were imaged in the Nikon A1R MP in confocal mode using an optical configuration with an excitation 488 nm and emission 500-550 nm.

As shown in FIGS. 1A and 1B by the spherical masses interspersed throughout these figures, a portion of the milk fat globule membranes are intact in the starting feed cream and in the concentrated cream product. In addition, the concentrated cream product remains in a homogenous oil-in-water emulsion or a bi-continuous emulsion (described below), which is further illustrated by conductivity readings taken of the product using a multi-meter in three different instances with conductivity measurements of 12.6 Ω, 15.2 Ω, and 14.1 Ω. It is only when a composition of oil and water is either not in a water continuous or water-oil bi-continuous state, thus existing exclusively as a water-in-oil emulsion, does a multi-meter not register a conductivity reading. Accordingly, by the conductivity measurements of the product, this starting composition is not inverted to a water-in-oil emulsion throughout product formation, nor is a heterogeneous mixture formed in the concentrated cream product. Further, the concentrated cream product is formed solely by moisture removal and mechanical working, and thus the product is not inverted to a water-in-oil emulsion and subsequently inverted back to an oil-in-water emulsion, for example, by the addition of water to a water-in-oil emulsion followed by mechanical working.

Additional imaging of the concentrated creams resulted in the discovery that although individual images of the product appeared to be oil-in-water emulsions, when these images were stacked, it showed that the emulsion appeared to be a bi-continuous emulsion. In a bi-continuous emulsion, there is a simultaneous continuous phase of oil and water. Both oil and water are predominant phases in the matrix and span a substantial portion of the stacked images. As a result of the water being continuous in the bi-continuous emulsion, the multi-meter will provide conductivity readings, i.e., due to the conductive nature of water. Therefore, it is believed that the concentrated creams of the present disclosure are one or more of an oil-in-water or a bi-continuous emulsion.

Compositionally, the concentrated cream products of the present disclosure may have a fat content of at least 70 percent by weight, from about 65 to about 82 percent by weight, and preferably about 74 percent by weight. The solids non-fat content, e.g., formed of protein, ash and lactose, may range from about 7 to about 12, from about 8 to about 11, or about 9.5 percent by weight of the product. The total solids may therefore range from between 72 to about 93 percent by weight. The moisture or water content may be up to about 23 percent, range from about 7 to about about 23 percent, preferably from about 15 to about 18 percent, or at about 17 percent by weight of the product. In addition, some concentrated creams may include added salt from between about 0.5 to about 3 percent by weight, and preferably from about 1 percent to about 3 percent by weight.

The concentrated cream products of the present disclosure are homogenous, oil-in-water or bi-continuous emulsions, and may retain the cream makeup of the starting cream, which may help with solubilization in water phases. This is in contrast to water-in-oil emulsions derived from cream or other water-in-oil emulsions that make solubilization in water phases difficult.

Methods of making concentrated cream: Processes for the evaporative concentration of cream with a resultant concentrated cream product involves evaporation of moisture from a starting cream composition. The starting cream may have a fat content of from about 35 percent by weight and up to about 55 percent by weight, and preferably about 45 percent by weight. The moisture content of the starting cream composition may be about 50 percent by weight with the balance non-fat solids. In some examples the starting cream composition may be one typically utilized in commercial butter/powder operations containing at least about 30 percent fat by weight, about 64 percent moisture by weight and about 36 percent solids by weight (e.g., about 6 percent non-fat solids by weight and 30 percent fat solids by weight). Cream minimally includes at least 18 percent fat by weight up to a typical commercial maximum of 48 percent fat by weight, a moisture content from about 48 percent by weight to about 64 percent by weight with the balance solids, and may be used as the starting cream. Salt may be present in the starting material, such as at a level of from about 0.5 percent by weight to about 3 percent by weight. In some aspects, the cream starting material may be cream produced directly from whole milk (e.g., bovine or goat milk) as opposed to being produced from reconstituted cream. Additionally, the starting cream may be ultra-filtered cream or whole milk in which a portion of the lactose or other cream constituents are removed while retaining the native fat. Ultra-filtration may be used, for example, where a lower moisture content starting cream is desired for the evaporative removal of moisture.

The starting cream composition may be preheated to temperatures from about 130° F. to about 200° F. at atmospheric pressure. However, preheating to temperatures of about 185° F. to about 200° F., or at about 195° F., may be preferred. In particular, it has been discovered that throughput may be increased when the starting cream is preheated to these elevated temperatures, and preheating to 185° F. to about 200° F. surprisingly does not cause the starting cream to scorch. In some aspects, preheating may be in a kettle or a jacketed tank where water or steam may be circulated around the vessel holding for gradual heating of the starting composition. However, more preferred is preheating using a plate heat exchanger or using direct steam injection/steam infusion processes.

In alternative implementations, the starting cream composition may be fed at ambient temperatures (e.g., about 72° F.) to the evaporator vessel. In particular, it has been discovered that at this starting temperature, the cream does not break at higher evaporator vessel operating speeds and may result in an increased throughput. For example, a Pfaulder Model 8.8-12S-0-S wiped film evaporator having 8.8 square feet of heated surface area may operate at speeds up to about 280 rpm when the feed cream is provided at ambient temperatures without the concentrated cream breaking. It is believed that operating this system with design changes, such as an increased gear ratio, would allow the evaporator to operate above 280 rpm without breaking the product.

The starting cream composition may be fed to an evaporator vessel where moisture in the composition is evaporated to form concentrated cream. In some implementations, the evaporator vessel may be configured as a vacuum chamber and may be operated under vacuum pressure from about 16 inHg to about 26 inHg (which corresponds to 176° F. to 122° F. boiling temperatures), and more preferably from about 20 inHg to about 26 inHg, or about 24 inHg. In the evaporator vessel, the composition may be continuously transferred by blades, such as by a mutator/wiper shaft of a wiped film evaporator or a scraped surface heat exchanger, to form a thin film while maintaining the composition at the evaporation temperatures via heat transfer walls. Alternatively, the evaporator vessel may house structures such as a rod mounted close to the heat transfer walls, which may rotate within the vessel and either contact or has a low clearance to the wall to generate a region of high turbulence thereby facilitating the evaporation of moisture. In addition, formation of the thin film may be facilitated by gravity flow along heat transfer walls. During the continuous transfer, moisture in the composition continues to evaporate, and due to the constant movement, burning or browning of the remaining cream composition may be avoided. It is believed that evaporative cooling of the composition may contribute to the avoidance of burning or browning.

The constant movement of the thin film within the evaporator at relatively low speeds results in a concentrated cream product with milk fat globules; membrane components, some of which may be intact; and non-fat solids. In other words, the concentrated cream retains the native cream constituents with the exception of a portion of the water from the starting cream. For example, an evaporator vessel configured as a wiped film evaporator may produce the concentrated cream products of the present disclosure when the evaporator receives a preheated starting cream and operates between about 75 RPM to about 225 RPM. At these low speeds, a reduced amount of mechanical stress is exerted on the fat globule phospholipid membranes, and may facilitate retention of intact phospholipid membranes in the concentrated cream product.

Further, due to the relatively low rotational speeds, the composition remains homogeneous in an oil-in-water or a bi-continuous emulsion without phase inversion. Accordingly, at these rotational speeds, the thin film may be continuously transferred along the evaporator walls at a rate that is low enough to avoid both phase inversion to a water-in-oil emulsion and bursting of a substantial portion of the fat globule phospholipid membranes subsequently yielding a heterogeneous mixture of free fat and coagulated serum, but which is fast enough to avoid browning or burning of the solids non-fat within the cream. Moreover, the concentrated cream product remains homogenous and conductive as described above in connection with FIG. 1B.

The resulting concentrated cream composition may be provided with the composition described above. For example, the concentrated cream may be formed with a total fat content of at least about 70 percent by weight, a moisture content of up to 23 percent by weight, and total solids content of between about 77 to about 90 percent by weight. The composition may be pumped out of or may flow from the evaporator vessel.

In some aspects, the cream composition may be subjected to processing in the evaporator over the course of about 1 to about 4 minutes, and in some cases, after about 1 to about 2 minutes. However, the time the cream composition is processed to yield the concentrated cream product may vary depending on the size of the evaporator. For example, a production scale evaporator such as a Turbafilm Evaporator Model 36-216 Manufactured by Cherry-Burrel Votator may retain the starting cream composition for a longer period of time but may have a higher throughput due to its increased volumetric capacity compared to a pilot plant evaporator that may hold the starting cream composition for a shorter period of time but produce less volume due to holding capacity limitations.

Evaporative cooling occurs as the cream exits the evaporator vessel at a temperature of about 80° F. In this implementation, the cream does not require pre-cooling prior to exiting. However, in some implementations, the cream may be further cooled to about 50° F. or lower, for example, to minimize the amount of time the cream is above 45° F. for food safety purposes.

Upon cooling the concentrated cream, the product remains in a homogenous state. In some cases, the product may be in an oil-in-water or bi-continuous emulsion.

The evaporator vessels that may be used in the evaporative concentration of the cream of the present disclosure may include wiped film evaporators, thin film evaporators, spinning cone evaporators and evaporative scraped surface heat exchangers, although wiped film evaporators may be preferred.

Accordingly, the removal of moisture or water from cream may be performed using a single evaporation step. The advantage of the evaporative technologies of the present disclosure is that a single pass is used to produce the concentrated cream. As a result, mechanical transfer steps between stages become unnecessary, which saves time and equipment costs. However, in the evaporative device, the heat exchange jacket may be divided into two or more segments, which allows for the temperature to be more precisely controlled. For example, as the concentration ratio increases near the discharge, the temperature of the jacket segment may be increased relative to preceding segments.

As the concentrated cream flows from the evaporator vessel, the product may be transferred for further processing, which may involve loading the product into barrels, palletizing, cooling and storage. Accordingly, the concentrated cream product exiting the evaporator vessel may optionally be received by pumps, and dairy product packaging equipment such as metal detectors, container fillers, palletizers and cooling and storage devices such as refrigerators or coolers. The concentrated cream product may contain about twice the fat and total solids compared to high fat creams.

In further aspects, the concentrated cream product may be incorporated with other food components for the production of food products, described below.

Methods of making concentrated cream using a wiped film evaporator: In a particular example of the present disclosure, processing of the starting composition may take place in wiped film evaporator. The starting cream composition described above may be preheated to temperatures between 180° F. and 200° F., or preferably at about 190° F. to about 198° F., and enter the evaporator, for example, at an upper end of the device. Alternatively, the starting cream may be fed to the evaporator at ambient temperatures. The pre-heated starting cream or starting cream at ambient temperatures may be processed by distributing the composition to heat transfer walls maintained at evaporation temperatures. Blades of the evaporator pass over or adjacent to the composition to continuously distribute the starting composition along the transfer walls form a thin film of heated cream at a rate of between about 75 to about 280 RPM. For example, for pre-heated starting creams, the wiped film evaporator may operate at a rate of about 75 RPM to about 225 RPM thereby avoiding phase inversion. For starting creams fed at ambient temperature, the wiped film evaporator may operate at a rate of about 75 RPM to about 280 RPM. However, it may be preferred that the wiped film evaporator operate between about 165 RPM to about 175 RPM. The wiped film evaporator may be operated in a counter-current flow mode or a co-current flow mode, however, a counter-current flow mode may be preferred. The wiped film evaporator may operate under vacuum pressure of from about 16 inHg to about 26 inHg. By using wiping blades as opposed to a churn or centrifugal force, a substantial portion of the fat globule phospholipid membranes contained in the starting cream composition may remain intact, and all phospholipid remains in the concentrated product. The preheated cream distributed on the heat transfer walls cause water vapors to rapidly generate to increase throughput of the cream, while the water vapors are carried into a separation area of the device where the vapors either condense on an internal condenser and flow out of the device or exit the device via a vacuum outlet. The heated product with the moisture removed through evaporation continues through the evaporator, e.g., through gravity flow, and exits a product outlet as a concentrated cream product.

Figure 2A:
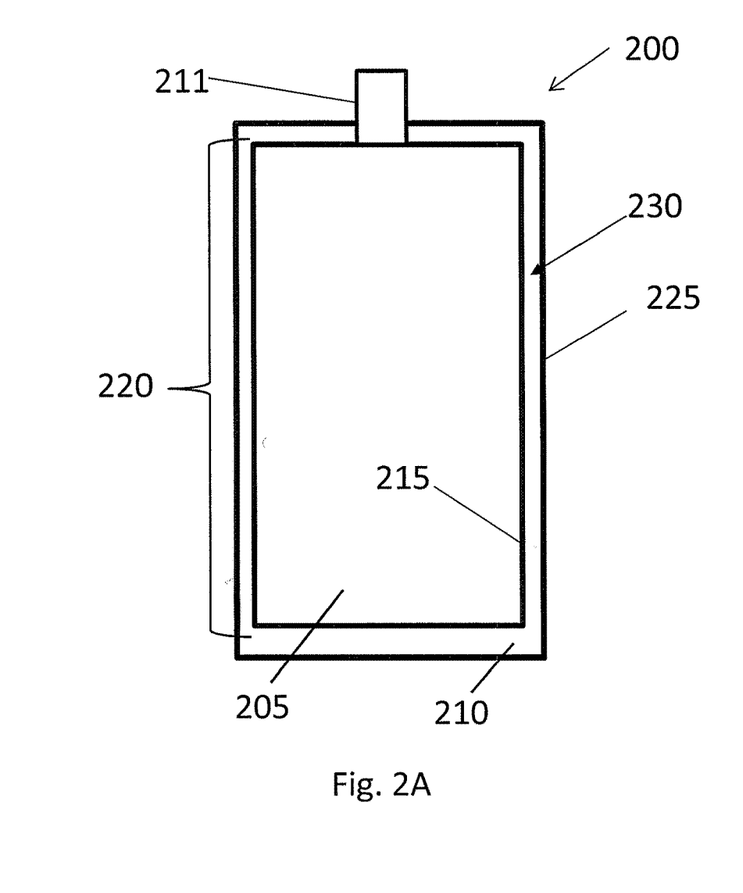
FIG. 2A schematically illustrates an agitated thin film evaporator.
Figure 2B:
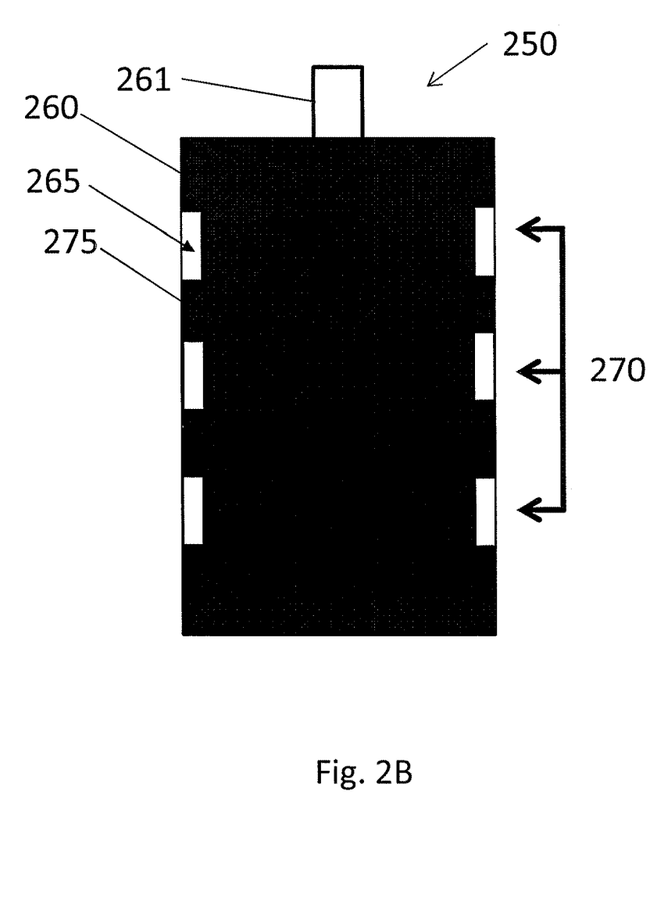
FIG. 2B schematically illustrates a wiped film evaporator.

It is preferred that for the resultant concentrated cream product that the design of the evaporator used be that of a wiped film design and construction. The use of wiped film evaporators is compared to agitated thin film evaporators in FIGS. 2A and 2B. In FIG. 2A, an agitated thin film evaporator 200 is shown, which is commonly designed with rigid, fixed clearance impeller 205 (shown in cross-section in FIG. 2A) spanning the length of the evaporation chamber 210 within the system, which rotates about a shaft 211. The rigid fixed clearance impellers 205 of the agitated thin film evaporator 200 are generally constructed such that a continuous impeller edge 215 spans the entire length of the evaporation chamber for each impeller in the system and results in a continuous high shear thin film zone 220. Between the impeller edge 215 of the fixed clearance impeller 205 and inner jacket chamber wall 225 resides a gap 230 where the evaporating fluid in a thin film occupies the evaporation chamber. This is opposed to wiped film evaporator designs as illustrated in FIG. 2B, where a wiped film evaporator 250 is shown. The wiped film evaporator 250 is comprised of impellers 255 (cross-section) that wipe the inner evaporation chamber surface 260, which rotates about a shaft 261 and limits the evaporating fluid gap 265 within the evaporation chamber. Clearance zones 270 for wiped film impeller designs yield chamber volume for fluid flow reside between what could be described as zero clearance teeth 275 of the impellers 255 that wipe the inner chamber surface 260 spanning the length of the wiped surface rotor as illustrated in FIG. 2B. These clearance zones 270 can be offset (and therefore the zero clearance teeth 275 can be offset) for additional impellers within the wiped film evaporator 250 so the entire wall surface is wiped during operation. In contrast, the rigid fixed clearance rotor 205, due to the additional edge 215 surface area spanning the entire length of the evaporator chamber 210 for each impeller, as opposed to the reduced edge surface of the zero clearance teeth 275 and fluid gap 265 of wiped film evaporators, tend to promote greater shear forces on fluids within the chamber volume gap 230 where the evaporating fluid resides while in the evaporation chamber. Due to this additional impeller surface and shearing fluid gap volume, greater shear is imparted to evaporating fluids at similar tip velocities in an agitated thin film evaporator as opposed to a wiped film evaporator. Holding impeller radius, length, and RPM constant, an agitated thin film evaporator will promote greater shear to an evaporating fluid than a wiped film evaporator design. It is this greater shear surface, and the forces that it promotes, where fat globules may rupture with subsequent loss of the oil-in-water character of the resultant concentrated cream product if concentrated with an agitated thin film evaporator.

In addition, average shear rate of an impeller in a mixing vessel can be defined as a function of a mixer viscometry constant (k') multiplied by the angular velocity: average shear rate=k'*Angular velocity. Generally k' scales with surface area, and given the increased area of a fixed clearance agitated thin film evaporator impellers compared to wiped film evaporator impellers, a greater average shear rate will result for an agitated thin film evaporator, thus tending to cause phase inversion, rupture of milk fat globule membranes yielding a heterogeneous mixture of free fat and coagulated serum at lower rotational speeds.

While falling film evaporators are generally used in the dairy industry, such evaporators are not appropriate for concentrating cream according to the present disclosure due to the high rate of moisture removal and thus high levels of solids, which would tend to remain on the surface of the heated tubes as opposed to flowing by gravity flow through the falling film evaporator. Particularly, cream would not flow from a falling film evaporator, but rather the flow would tend to stop as the concentration ratio or solids level increased to the levels described in the present disclosure.

Further, concentrating through evaporation in prior approaches is typically one of multiple types of concentrating used in series. Generally, concentrating is through evaporation followed by spray drying; or concentration through evaporation and separation, followed by spray drying. Prior to spray drying, the concentrated product is typically up to about 50 percent solids by weight with the balance moisture. When the solids level reaches beyond 50 percent by weight, this presents challenges as the spray drying equipment becomes clogged, rendering the system unusable. Therefore, dried cream from spray drying typically contains about 40 percent fat by weight. Consequently, processes for forming dried cream do not provide guidance for forming the concentrated creams of the present disclosure having a higher fat content. Additionally, spray drying cream is a more costly approach for handling cream and yields a product that can oxidize which can result in stale flavors in food products such as process cheeses, and is prone to oiling off during the manufacture of process cheese, blocking or plugging of pneumatic material handling transfer lines and clumping. Further, the feed for producing dry creams requires homogenization, which destroys milk fat globule membranes.

Further still, concentrating through evaporation process differs from churn and separation (e.g., centrifuge) processes where cream constituents such as solids non-fat are carried away within buttermilk or serum in the byproduct stream. Particularly, concentration of fat through centrifugal and shearing forces fracture fat globule membranes where a portion of moisture in the cream is entrapped within the coalescing fat globules yielding a water-in-oil emulsion state resulting additionally in a predominant loss of moisture in the cream and the solids non-fat contained therein. Additionally, at typical churning temperatures where the milk fat within the fat globules are in a semi-crystalline state, as they rupture they form butter granules via fat-fat interactions that entrap moisture and upon further working form a smooth consistency, yielding a fat continuous, water-in-oil emulsion.

Concentrating through evaporation instead provides advantages over prior approaches. It eliminates churn management; further concentrating vessels for the buttermilk stream; as well as equipment related to spray drying such as storage silos, additional evaporators, separators, pumps; and spray drying devices, powder bins and packaging equipment. Further, relative to churn equipment or using centrifuges in series, the evaporative methods may reduce the chance of microbial growth in the system. Particularly when cream is fed at above pasteurization temperatures, the chance for microbial growth in processing lines prior to the evaporator and within the evaporator's vacuum chamber are decreased compared to the churn or centrifuge operating below pasteurization temperatures and not under vacuum. As a result, extended run times may be possible. In comparison to separation processes through centrifugation, concentrating through evaporation eliminates the aforementioned equipment related to spray drying and additional centrifuges and creation and management of an undefined liquid serum byproduct stream. In addition, evaporation retains the native cream constituents including the solids non-fat in the concentrated cream and results in the elimination of additional processing steps where solids non-fat are added back into the concentrated cream, as is typically done in the manufacture of dried cream, wherein non-fat dry milk is commonly reconstituted and blended with cream prior to subsequent evaporation and spray drying. As solids non-fat are retained in the concentrated cream, this means that a reduced level of solids non-fat will be added to products containing higher levels of solids non-fat, such as in spreads and process cheeses products.

In addition, as provided above, the waste or byproduct stream resulting from the concentrated cream processes of the present disclosure is pure water, which is easily managed, whereas the serum byproduct streams contain solids non-fat components, which requires additional management steps or payment for disposal, making these nuisance byproduct streams.

Moreover, retaining the phospholipid membranes in the concentrated cream may provide benefits with respect to organoleptic properties, ingredient application functionality and health benefits. For example, health benefits have been reported in consumers ingesting phospholipid membranes derived from bovine milk fat, for example, at Spitsberg, V. L., *Invited review: Bovine milk fat globule membrane as a potential nutraceutical*, J. Dairy Sci. 2289-94 (2005); and at Küllenberg, D. et al., *Health effects of dietary phospholipids*, Lipids Health Dis. 2012; 11: 3 (2012).

Implementations of Use:

The concentrated cream products of the present disclosure may be used as stand-alone products, or may be used in combination with other food components to form cream-containing products. While some creams used as a component in food product may contain about 50 percent moisture by weight, the concentrated cream products of the present disclosure include a substantially reduced moisture content, which allows them to be incorporated into food products having strict moisture requirements. Thus, for example, the concentrated cream products may be a more fat-efficient product for use in the production food products that allow only a certain amount of moisture, such as process cheese and butter-like spreads, where the typical maximum allowable moisture content is 40 percent by weight for process cheese and 22 percent by weight for that of butter-like spreads.

In process cheese, the concentrated cream may be used as an added fat source while delivering increased milk solids and improved flavor characteristics over dried sources of cream. In addition, the firmness of butter-like spreads may be softer with use of the concentrated cream ingredient as the native fat globule membranes are retained at the surface of the fat globules and the other non-fat dairy solids present in the concentrated cream could further impede the fat-fat interactions in the product.

In additional aspects, the concentrated cream may replace butter in substantially any food preparation applications including baking and frying applications. The concentrated cream may be used as a fat source in the manufacture of "butter like spreads" instead of starting with butter, and may be used for cost savings in the manufacture of sautá butters. In another example, the concentrated cream may be used as a starting material replacing butter in processes for forming brown butter. The concentrated cream may be whipped with nitrogen to form whipped-type products or may be used as an ingredient in ice cream.

In further aspects, the concentrated cream product may be used to reform traditional cream. The concentrated cream product may be provided in its concentrated form and may be free of added constituents. The product may be stored and subsequently recombined at a further point with skim milk to form cream containing at least 18 percent fat by weight and even beyond that of 75 percent fat by weight. This approach of separate storage of the concentrated cream and the solids non-fat component of skim milk powder or non-fat dry milk is in contrast to prior approaches where these components are blended and co-dried yielding a product with at least 40 percent fat by weight and up to 75 percent fat by weight and stored in dry form for up to twelve months, which can result in negative flavor aspects. Such negative flavors may be avoided by the separate storage of the concentrated cream products from the skim milk.

The concentrated cream and food products formed with concentrated cream may be used in consumer, foodservice and industrial applications.

Aspects of the present disclosure are described in the following production Examples, which are intended for illustration only, and those skilled in the art will appreciate that modifications and variations may be made without departing from the scope of the present disclosure.

EXAMPLE 1

In a production plant study, heavy cream containing 46 percent fat by weight was warmed to various feed temperatures from approximately 130° F. to 200° F. and fed to an evaporator (Cherry-Burrel Votator TurbaFilm Evaporator) with a jacket temperature of approximately 140° F. under a vacuum ranging from about 20 inHg to about 26 inHg. The feed rates increased as the feed temperature increased and ranged from 50 lbs. to 70 lbs. per minute. The evaporator mutator/wiper shaft operated at speeds ranging from about 75 to about 176 RPM, with the rotation speed increasing with increasing feed temperatures. During production, the by-product stream was solely formed of water. The results of the Example are provided in Table 2 below.

TABLE 2

| Run | Feed rate to the evaporator (lbs./min) | Feed Temp (° F.) | Rotor RPMs | Moisture (%) | Solids (%) | Fat (%) | Production rate (lbs./min) |
|---|---|---|---|---|---|---|---|
| 1 | 49 | 129 | 74 | 19 | 81 | 72 | 32 |
| 2 | 50 | 156 | 75 | 17 | 83 | 72 | 32 |
| 3 | 57 | 185 | 125 | 17 | 83 | 72 | 37 |
| 4 | 61 | 189 | 125 | 19 | 81 | 72 | 40 |
| 5 | 61 | 192 | 150 | 19 | 81 | 72 | 40 |
| 6 | 61 | 193 | 176 | 19 | 81 | 72 | 40 |
| 7 | 62 | 193 | 165 | 18 | 82 | 72 | 41 |
| 8 | 66 | 190 | 165 | 17 | 83 | 72 | 43 |
| 9 | 65 | 197 | 165 | 18 | 82 | 72 | 42 |

Fat content in the samples collected was determined by Mojonnier, base hydrolysis, and moisture content was determined by forced-air treatment at 100° C. for 4 hours and 5 hours for the respective feed and concentrated samples. Solids non-fat content is provided as the balance of the cream composition after accounting for the fat and moisture content.

The results of Table 2 show that the samples collected from the concentrated cream production process provided concentrated creams at acceptable fat, moisture and total solids levels. The processing conditions provided for boiling and vapor removal under vacuum while preventing or minimizing browning of any reducing sugars present in the feedstock and minimizing protein denaturation. Surprisingly, by feeding the starting cream at elevated temperatures of up to 197° F. provides a highly superheated feed stream and more latent heat of vaporization upon being subjected to the vacuum in the operating environment. This results in an increased rate of moisture removal, allowing for a faster rate of production, which surprisingly does not result in scorching. Additionally, a rotor setting of up to 176 RPM avoided phase inversion to a water-in-oil emulsion, and rupture of a significant portion of milk fat globule membranes that would yield a heterogeneous, two phase mixture of free fat and coagulated serum, although a setting of up to 225 RPM would be acceptable for avoiding phase inversion. Further, while the production run operated from between 20 to 26 inHg, it is believed that a more efficient vacuum may further facilitate increased throughput of the concentrated cream product.

EXAMPLE 2

In a pilot plant test run, a starting cream containing fat at 46 percent by weight and at ambient temperatures (e.g., 70° F.) was fed to a Pfaulder Model 8.8-12S-0-S wiped film evaporator having an internal diameter of 12.375" at a rate of about 0.375 gallons per minute (about 3.1 lbs. per minute). The starting cream was salted, and resulted in a concentrated cream with approximately 6 percent salt in moisture by weight of the product. The wiped film evaporator operated at speeds from 200 to 281 RPM without breaking as reflected by the conductivity readings in Table 3.

TABLE 3

Concentrated cream conductivity, final solids and associated wiped film evaporator speeds, 70° F. feed

| Sample | Conductivity Reading (Ω) | Final Solids | RPM |
|---|---|---|---|
| 1 | 58 | 78 | 200 |
| 2 | 9.4 | 82 | 230 |
| 3 | 3 | 81.92 | 245 |
| 4 | 3.6 | 81.94 | 260 |
| 5 | 15.8 | 83.63 | 275 |
| 6 | 15.3 | 81.96 | 281 |

EXAMPLE 3

In a pilot plant test run, a starting cream containing fat at 46 percent by weight and pre-heated to 130° F. was fed to the wiped film of Example 2. The feed cream was salted as in Example 2. The wiped film evaporator operated at speeds from 198 to about 225 RPM without breaking as reflected by the conductivity readings in Table 4.

TABLE 4

Concentrated cream conductivity, final solids and associated wiped film evaporator speeds, 130° F. feed

| Sample | Conductivity Reading (Ω) | Final Solids | RPM |
|---|---|---|---|
| 1 | 25.7 | 85.77 | 200 |
| 2 | 20.4 | 86.76 | 220 |
| 3 | Open | NA | 250 |
| 4 | 25.8 | 85.4 | 198 |
| 5 | 24.2 | 87.69 | 210 |
| 6 | Open | NA | 233-234 |
| 7 | Open | NA | 226 |

TABLE 4-continued

Concentrated cream conductivity, final solids and associated wiped film evaporator speeds, 130° F. feed

| Sample | Conductivity Reading (Ω) | Final Solids | RPM |
|---|---|---|---|
| 8 | 34.2 | 87.21 | 220 |
| 9 | 42.3 | 87.05 | 222 |
| 10 | 33.2 | 87.27 | 224 |
| 11 | 34.6 | 87.74 | 224 |

Figure 3:
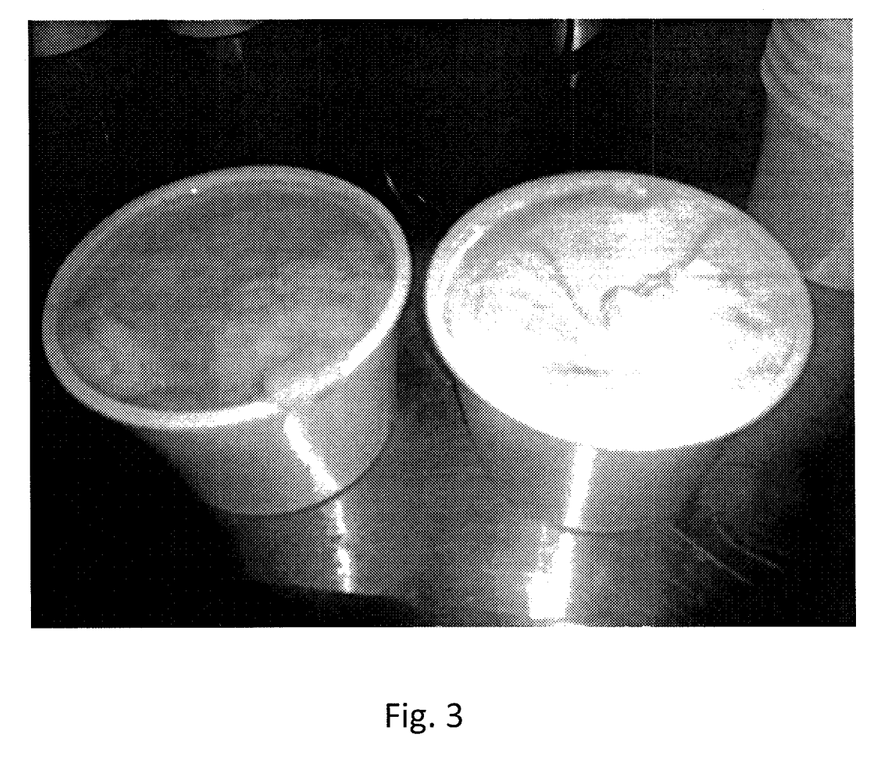
FIG. 3 is an image of two samples produced from a wiped film evaporator.

FIG. 3 provides two samples produced from a wiped film evaporator. The left sample is a broken sample in which the feed cream inverted into an undesirable two-phase heterogeneous mixture of free fat and a coagulated serum comprised of a water-in-oil emulsion. On the left side, the oil and the solids are separated, resulting in color, compositional and consistency variations. The right sample is a concentrated cream product of the present disclosure that is a homogenous, oil-in-water or bi-continuous emulsion.

While the present disclosure provides various ranges, it will be understood that values, such as numeric integer values, at or within these ranges, or various ranges within the disclosed ranges, or ranges beginning or ending at a range value and beginning or ending at a value within the disclosed ranges may be used in particular embodiments without departing from the invention. For example, the percentage of fat (by weight) within the concentrated cream may be any integer value from about 60 to about 82, and the percentage of fat (by weight) within the starting cream may be any integer value from about 35 to about 55.

The compositions, apparatuses and functions of the various implementations may be used interchangeably to form alternative implementations, as would be appreciated by those skilled in the art. Although the present disclosure provides references to specific embodiments, persons skilled in the art will recognize that changes may be made in form and detail without departing from the spirit and scope of the invention.

What is claimed is:

1. A method of producing concentrated cream, the method comprising:
   providing a cream composition in a homogenous, oil-in-water emulsion, the cream composition comprising fat globules, phospholipid membrane components, and non-fat solids,
      wherein an initial fat content of the cream composition is between about 35 to about 55 percent by weight; and
   removing moisture from the cream composition through evaporative processing using a wiped film evaporator to produce the concentrated cream,
      wherein the concentrated cream remains in a homogenous state as the oil-in-water emulsion or as a bi-continuous emulsion,
      wherein the step of removing moisture causes the concentrated cream to retain the native fat globules, native phospholipid membrane components, and native non-fat solids, and
      wherein the concentrated cream comprises a fat content of at least about 70 percent to about 82 percent by weight.

2. The method of claim 1, wherein the oil-in-water emulsion comprises intact fat globules, and wherein at least a portion of the intact fat globules remain intact in the concentrated cream product.

3. The method of claim 1, wherein the evaporative processing takes place in a vacuum chamber under a vacuum pressure of about 16 inHg to about 26 inHg.

4. The method of claim 1, wherein the wiped film evaporator operates from about 75 rpm to about 280 rpm.

5. The method of claim 1, wherein the wiped film evaporator forms a thin film using one or more blades transferring the cream composition to heat transfer walls within the wiped film evaporator.

6. The method of claim 1, wherein the cream composition is provided at ambient temperatures.

7. The method of claim 1, further comprising heating the cream composition to about 130° F. to about 200° F. prior to the step of removing moisture.

8. The method of claim 1, further comprising cooling the concentrated cream, said concentrated cream remaining in the homogenous state upon cooling.

9. The method of claim 1, wherein an initial moisture content of the cream composition is at least 50 percent by weight and a moisture content of the concentrated cream product is up to about 20 percent by weight.

10. The method of claim 1, wherein a moisture content of the concentrated cream product is about 17 to about 19 percent by weight.

11. The method of claim 1, wherein the concentrated cream product includes a total solids content of at least about 78 percent to about 93 percent by weight.

12. The method of claim 1, wherein the concentrated cream comprises a salt and a retained native non-fat solids content of at least about 8 percent by weight.

13. A concentrated cream product produced by the method of claim 1.

14. A method of producing a concentrated cream product, the method comprising:
   providing a homogenous, oil-in-water emulsion derived from whole milk, the emulsion comprising fat globules, phospholipid membrane components, and non-fat solids, wherein an initial fat content of the emulsion is between about 35 to about 55 percent by weight; and
   removing moisture from the emulsion through evaporative processing using a wiped film evaporator to produce the concentrated cream product,
      wherein the concentrated cream product remains as the oil-in-water emulsion or is in a bi-continuous emulsion,
      wherein said emulsion retains the fat globules, phospholipid membrane components, and non-fat solids, and
      wherein the concentrated cream product comprises a fat content of at least about 70 percent to about 82 percent by weight.

15. The method of claim 14, wherein the oil-in-water emulsion comprises intact fat globules, and wherein at least a portion of the intact fat globules remain intact in the concentrated cream product.

16. The method of claim 14, wherein the wiped film evaporator operates from about 75 rpm to about 280 rpm.

17. The method of claim 14, wherein the wiped film evaporator operates under a vacuum pressure of about 16 inHg to about 26 inHg.

18. The method of claim 14, wherein a moisture content of the concentrated cream product is up to about 20 percent by weight.

19. The method of claim 14, wherein the concentrated cream product comprises a salt and a native non-fat solids content of 9 to about 11 percent by weight without the addition of non-fat solids to the concentrated cream product.

20. The method of claim 14, further comprising ultra-filtering the whole milk prior to the providing step.

\* \* \* \* \*

UNITED STATES PATENT AND TRADEMARK OFFICE
CERTIFICATE OF CORRECTION

| | |
|---|---|
| PATENT NO. | : 11,571,000 B2 |
| APPLICATION NO. | : 17/458846 |
| DATED | : February 7, 2023 |
| INVENTOR(S) | : Thomas A. Glenn, III et al. |

It is certified that error appears in the above-identified patent and that said Letters Patent is hereby corrected as shown below:

In the Specification

In Column 10, Line 38, delete ""sautá"" and replace with --sauté--

Signed and Sealed this
Thirteenth Day of February, 2024

*Katherine Kelly Vidal*

Katherine Kelly Vidal
*Director of the United States Patent and Trademark Office*